Patented Nov. 10, 1931

1,830,909

UNITED STATES PATENT OFFICE

ROYER LUCKENBACH, OF BROOKLYN, NEW YORK, ASSIGNOR OF ONE-TENTH TO WILLIAM A. HUGHES, OF NEWARK, NEW JERSEY

METHOD AND MATERIAL FOR MINERALS SEPARATION

No Drawing. Application filed April 26, 1928. Serial No. 273,154.

The present invention relates to the concentration of ores by the flotation process, and has for its object to provide a cheap but powerful flotation reagent which will select or gather the mineral content of the ore. The invention also relates to method and process using the reagent of the invention.

The invention more particularly relates to the use of a xanthate and sulphur, with or without other materials, for the separation of minerals from ores.

I have discovered that by using sulphur and a xanthate together, certain minerals can be separated from their ores which before could not be worked to a practical degree, and the sulphur and xanthate together can be used for separating various minerals from their ores. Minerals which can be separated from their ores are, among other, carbonates, silicates, and oxides of copper, zinc and lead.

The process of the invention can be carried out in the presence of any known frothing agent such, for example, as pine oil, resinous products, creosote, peanut oil, or any others.
The frothing agent is used for the forming of bubbles in the water of the separation bath when the latter is aerated or agitated, whereby the minerals together with the selector material of the invention are carried by the bubbles and separated from the residue. The selector material of the invention, as above stated, consists of sulphur and a xanthate, with or without other materials. The xanthate used is preferably an alkali metal xanthate, sodium or potassium xanthate being practical examples. The other materials referred to as being usable with the sulphur and xanthate are, among others, acids or alkalis which and for one purpose, are used to qualify the selector of the invention to secure desired degrees of acidity, alkalinity, or neutrality to suit conditions of operation and so on.

The alkali metal xanthate can be prepared either beforehand or it can be made in the flotation bath.

When made beforehand the xanthate can be prepared by adding together the following materials in the proportions indicated: Carbon bisulphide 76 cc., alcohol 50 cc., caustic soda or potash 40 grams, and water 50 cc., as set forth in my U. S. Patent application Serial Number 83,398, filed January 23, 1928. The sulphur can be added to the xanthate either before, during, or after the addition of the latter to the flotation bath.

The sulphur can be added to the ingredients from which the xanthate is made, in the following manner and in about the proportions indicated by the quantities herein cited.

10 grams of powdered sulphur are added to 50 cc. of water and 40 grams of caustic soda (or potash). This is heated gently until all is in solution. The alcohol is then added and finally the carbon bisulphide. The resulting product is used as a mineral selector, and its selective properties are much greater in the case of oxides, silicates, carbonates, and other minerals which are not sulphide or predominantly sulphides, of copper, zinc, tin, and lead, etc., than are those of the xanthate without the sulphur. Dichlorbenzol and carbon bisulphide in equal proportions with the sulphur can be also used to modify the xanthate to select non-sulphide minerals.

It is to be understood, however, that the materials and process of the invention are suitable for separating sulphide ores, but the nonsulphides are the ones with which the most trouble has been experienced in mineral separation. The additional sulphur cooperates with the xanthate in forming an attachment to the minerals to be selected whereby is formed a unit which can be floated by the materials used for that purpose. Sulphur has been used with other materials for this purpose but no combination has been produced before which has made practical the separation of oxides, carbonates and silicates of copper, zinc, and lead.

I do not confine myself to the use of powdered sulphur as sodium sulphide or sulphurated hydrogen or the sulphur chlorides or sulphur dioxide, can also be used very effectively in making the improved xanthate, but have found flowers of sulphur in a caustic alkali solution to be preferred for the purpose specified, as its sulphidizing action is more thorough on both the water of the ore pulp and the mineral in it. The selector produced with the alkaline solution of sulphur also has frothing qualities and enables less of the frothing oil or reagent to be used, and by its use a greater economy is obtained in the use of flotation materials.

It is considered that the invention has been fully stated above but it is clear, in more or less complicated chemical relations which exist as in here, that various modifications of the selector can be made to suit conditions met in its use. These modifications will be apparent to an assayer or one skilled in minerals separation, and are for the most part made to suit the nature of the water used in the flotation, to suit the characteristics of the ore and of the minerals therein, and to suit the characteristics of the flotation oils, etc.

Having described my invention, what I claim as new and desire to secure by Letters Patent is:

1. A minerals separation material obtained by dissolving sulphur in a solution of caustic alkali and adding alcohol and carbon bisulphide to form a xanthate intermixed with the sulphur.

2. A minerals separation product obtained by making an alkali xanthate from caustic alkali, alcohol carbon bisulphide and water, using an excess of caustic alkali over that necessary to react with the other said materials to form the xanthate, and simultaneously mixing therewith material capable of supplying sulphur under the conditions of the reaction.

3. The method of preparing a minerals separation product which comprises making an alkali xanthate from caustic alkali, alcohol, carbon bisulphide and water, using an excess of caustic alkali over that necessary to react with the other said materials to form the xanthate, and simultaneously mixing therewith material capable of supplying sulphur under the conditions of the reaction.

4. In a method of minerals separation by froth flotation the step which comprises adding together caustic alkali, alcohol, carbon bisulphide and water, using an excess of caustic alkali over that necessary to react with the other said materials to form the xanthate, and simultaneously mixing therewith material capable of supplying sulphur under the conditions of the reaction.

5. The process of concentrating ores by flotation which comprises adding to a mineral pulp an alkaline solution of sulphur and a xanthate, agitating the pulp to form a froth and separating the froth from the pulp.

In testimony that I claim the invention set forth above I have hereunto set my hand this 18th day of January, 1928.

ROYER LUCKENBACH.